(12) United States Patent
Minami et al.

(10) Patent No.: US 12,461,128 B2
(45) Date of Patent: Nov. 4, 2025

(54) CURRENT SENSOR

(71) Applicants: Yokogawa Electric Corporation, Musashino (JP); Yokogawa Test & Measurement Corporation, Hachioji (JP)

(72) Inventors: Hiroki Minami, Hachioji (JP); Hiroyuki Ishida, Hachioji (JP)

(73) Assignees: Yokogawa Electric Corporation, Tokyo (JP); Yokogawa Test & Measurement Corporation, Tokyo (JP)

( * ) Notice: Subject to any disclaimer, the term of this patent is extended or adjusted under 35 U.S.C. 154(b) by 167 days.

(21) Appl. No.: 18/343,220

(22) Filed: Jun. 28, 2023

(65) Prior Publication Data

US 2024/0012033 A1  Jan. 11, 2024

(30) Foreign Application Priority Data

Jul. 7, 2022  (JP) .................................. 2022-110063

(51) Int. Cl.
*G01R 15/20* (2006.01)
*G01R 19/00* (2006.01)

(52) U.S. Cl.
CPC ......... *G01R 15/202* (2013.01); *G01R 15/207* (2013.01); *G01R 19/0092* (2013.01)

(58) Field of Classification Search
None
See application file for complete search history.

(56) References Cited

U.S. PATENT DOCUMENTS

| 11,346,866 B2 * | 5/2022 | Han ..................... G01R 15/185 |
| 2007/0114992 A1 * | 5/2007 | Muniraju ............. G01R 15/207 |
| | | 324/225 |

(Continued)

FOREIGN PATENT DOCUMENTS

| DE | 102018210466 A1 | 1/2019 |
| JP | S61-228370 A | 10/1986 |

(Continued)

OTHER PUBLICATIONS

Extended (Supplementary) European Search Report dated Dec. 1, 2023, issued in counterpart EP Application No. 23182803.9. (7 pages).

(Continued)

*Primary Examiner* — Dominic E Hawkins (57) ABSTRACT

A current sensor includes a magnetic core that can be arranged to surround a conducting wire through which a current to be measured flows, magnetic sensors each configured to detect magnetic flux in a predetermined portion of the magnetic core, amplifiers arranged in correspondence with the magnetic sensors, feedback coils arranged in correspondence with the magnetic sensors, and a current detector that detects the current to be measured based on a current yielded by combining currents flowing through each of the feedback coils. Each of the amplifiers amplifies an output of the corresponding magnetic sensor and outputs a current corresponding to the output of the corresponding magnetic sensor. Each feedback coil is wound around the magnetic core and passes the current outputted by the corresponding amplifier in a direction that cancels the corresponding magnetic flux in the predetermined portion of the magnetic core.

5 Claims, 9 Drawing Sheets

(56) References Cited

U.S. PATENT DOCUMENTS

| | | | | |
|---|---|---|---|---|
| 2012/0062215 A1* | 3/2012 | Ide | ....................... | G01R 15/205 |
| | | | | 324/202 |
| 2014/0292319 A1 | 10/2014 | Fang et al. | | |
| 2017/0336443 A1* | 11/2017 | Yokota | ................. | G01R 15/148 |
| 2018/0095112 A1 | 4/2018 | Weiss | | |
| 2018/0120357 A1* | 5/2018 | Takenaka | ............... | G01R 15/20 |
| 2018/0284161 A1* | 10/2018 | Shinagawa | .......... | G01R 15/186 |
| 2020/0249258 A1 | 8/2020 | Goetz | | |
| 2021/0239774 A1 | 8/2021 | Saito et al. | | |
| 2022/0082590 A1* | 3/2022 | Steuer | ................. | G01R 15/207 |
| 2022/0128604 A1 | 4/2022 | Han et al. | | |
| 2022/0334146 A1 | 10/2022 | Fan | | |
| 2024/0019499 A1 | 1/2024 | Wang | | |

FOREIGN PATENT DOCUMENTS

| | | |
|---|---|---|
| JP | H03-18765 A | 1/1991 |
| JP | 2003-043073 A | 2/2003 |
| JP | 2018-072220 A | 5/2018 |
| JP | 2023-549802 A | 11/2023 |

OTHER PUBLICATIONS

Office Action dated Feb. 26, 2025, issued in counterpart EP Application No. 23182803.9. (4 pages).
Office Action dated Janaury 28, 2025, issued in counterpart JP Application No. 2022-110063, with English translation. (8 pages).

* cited by examiner

CURRENT SENSOR

CROSS-REFERENCE TO RELATED APPLICATION

The present application claims priority to Japanese Patent Application No. 2022-110063 filed on Jul. 7, 2022, the entire contents of which are incorporated herein by reference.

TECHNICAL FIELD

The present disclosure relates to a current sensor.

BACKGROUND

When a current to be measured flows in a conducting wire, a magnetic field is generated around the conducting wire due to the effect of electromagnetic induction. Patent literature (PTL) 1 and 2 describe clamp sensors that use this effect of electromagnetic induction to measure a current to be measured based on the measured value of the magnetic field generated in a magnetic core located around the conducting wire.

CITATION LIST

Patent Literature

PTL 1: JP H3-18765 A
PTL 2: JP 2003-43073 A

SUMMARY

A current sensor according to an embodiment includes:
a magnetic core that can be arranged to surround a conducting wire through which a current to be measured flows;
a plurality of magnetic sensors each configured to detect magnetic flux in a predetermined portion of the magnetic core;
a plurality of amplifiers arranged in correspondence with the plurality of magnetic sensors;
a plurality of feedback coils arranged in correspondence with the plurality of magnetic sensors; and
a current detector configured to detect the current to be measured based on a current yielded by combining currents flowing through each of the plurality of feedback coils, wherein
each of the plurality of amplifiers is configured to amplify an output of the corresponding magnetic sensor and output a current corresponding to the output of the corresponding magnetic sensor, and
each of the plurality of feedback coils is wound around the magnetic core and passes the current outputted by the corresponding amplifier in a direction that cancels the corresponding magnetic flux in the predetermined portion of the magnetic core.

BRIEF DESCRIPTION OF THE DRAWINGS

In the accompanying drawings.

DETAILED DESCRIPTION

The aforementioned configuration has room for improvement in the measurement accuracy of the current to be measured in a case in which the conducting wire is not located in the center of the magnetic core.

It would be helpful to provide a current sensor that can measure, with higher accuracy, a current to be measured flowing through a conducting wire.

A current sensor according to an embodiment includes:
a magnetic core that can be arranged to surround a conducting wire through which a current to be measured flows;
a plurality of magnetic sensors each configured to detect magnetic flux in a predetermined portion of the magnetic core;
a plurality of amplifiers arranged in correspondence with the plurality of magnetic sensors;
a plurality of feedback coils arranged in correspondence with the plurality of magnetic sensors; and
a current detector configured to detect the current to be measured based on a current yielded by combining currents flowing through each of the plurality of feedback coils, wherein
each of the plurality of amplifiers is configured to amplify an output of the corresponding magnetic sensor and output a current corresponding to the output of the corresponding magnetic sensor, and
each of the plurality of feedback coils is wound around the magnetic core and passes the current outputted by the corresponding amplifier in a direction that cancels the corresponding magnetic flux in the predetermined portion of the magnetic core.

The current sensor can therefore effectively cancel non-uniformly distributed magnetic flux even when the conducting wire is shifted from the center of the magnetic core and can reduce residual magnetic flux without an increase in size. According to the current sensor, the current to be measured flowing through the conducting wire can thus be measured with higher accuracy.

An embodiment further includes a resistor through which the current yielded by combining the currents flowing through each of the plurality of feedback coils flows, and the current detector is configured to detect the current to be measured based on a voltage at both ends of the resistor. With a simple configuration, the current to be measured can thus be detected based on the current yielded by combining the currents flowing through each of the plurality of feedback coils.

In an embodiment, the plurality of magnetic sensors may be configured to detect a magnetic flux of a plurality of portions of the magnetic core arranged at equal angles as viewed from a center of the magnetic core as the magnetic flux in the predetermined portion. The current sensor can thus measure the current to be measured with high accuracy based on the current outputted from the plurality of feedback coils.

An embodiment further includes a position detector configured to detect a position of the conducting wire relative to the magnetic core based on the current flowing through each of the plurality of feedback coils. The position of the conducting wire relative to the magnetic core can thus be detected.

In an embodiment, the magnetic core may be openable and closable. The conducting wire can thus be easily clamped by the current sensor.

According to an embodiment of the present disclosure, the current to be measured flowing through the conducting wire can be measured with higher accuracy even when the conducting wire is not located at the center of the magnetic core.

Comparative Example

Figure 1:
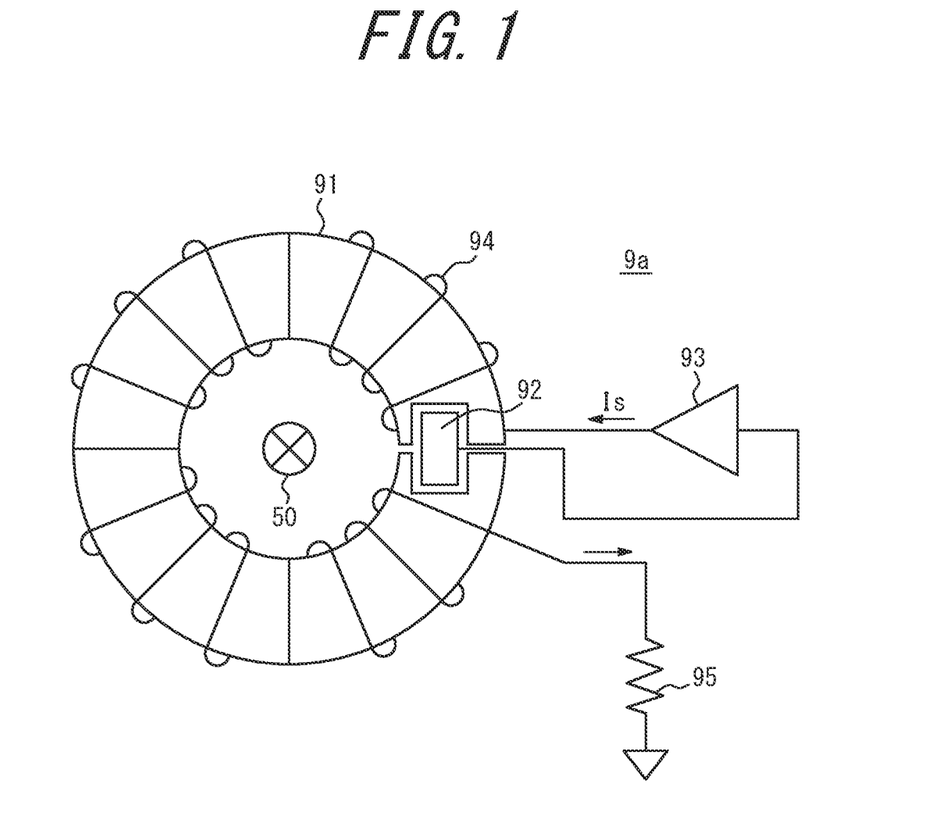
FIG. 1 is a diagram illustrating a configuration of a current sensor according to a comparative example.

FIG. 1 is a diagram illustrating a configuration of a current sensor 9a according to a first comparative example. The current sensor 9a is a zero-flux type sensor that measures a current to be measured flowing through a primary conductor 50. The current sensor 9a includes a magnetic core 91, a magnetoelectric conversion element 92, an amplifier 93, a secondary winding 94, and a resistor 95.

When a current flows through the primary conductor 50, a magnetic field corresponding to the current in the primary conductor 50 is formed around the primary conductor 50 due to the effect of electromagnetic induction. The magnetoelectric conversion element 92 is installed in the gap (void) of the magnetic core 91, which is a magnetic body, and outputs a current corresponding to the intensity of the magnetic flux generated in the magnetic core 91 to the amplifier 93. The amplifier 93 amplifies the current inputted from the magnetoelectric conversion element 92 and outputs the current as feedback current Is to the secondary winding 94. The secondary winding 94 is wound around the magnetic core 91 to cancel the magnetic flux generated in the magnetic core 91. The feedback current Is outputted from the amplifier 93 is outputted through the secondary winding 94 to the resistor 95. The voltage detected at the resistor 95 is amplified, and the amplified voltage is converted to a value of current flowing through the primary conductor 50. Here, the voltage at the resistor 95 is converted to the current value of the primary conductor 50 based on the case in which the primary conductor 50 is located at the center of the magnetic core 91.

In a configuration with one magnetoelectric conversion element 92, such as the current sensor 9a, if the primary conductor 50 is shifted from the center of the magnetic core 91, the intensity of the magnetic flux passing through the magnetoelectric conversion element 92 changes significantly, even if the value of current flowing through the primary conductor 50 is constant. Consequently, the feedback current Is varies greatly according to the position of the primary conductor 50, and the error in the measured value of the primary conductor 50 converted from the voltage of the resistor 95 grows large.

For example, if the primary conductor 50 is located to the right of the center of the magnetic core 91 to approach the magnetoelectric conversion element 92 in FIG. 1, the magnetoelectric conversion element 92 detects a magnetic flux with higher intensity than when the primary conductor 50 is located at the center of the magnetic core 91. Consequently, the feedback current Is flowing through the secondary winding 94 increases, and a value greater than the current actually flowing through the primary conductor 50 is measured as the current value of the primary conductor 50. Conversely, if the primary conductor 50 is located to the left of the center of the magnetic core 91 away from the magnetoelectric conversion element 92 in FIG. 1, the magnetoelectric conversion element 92 detects a magnetic flux with lower intensity than when the primary conductor 50 is located at the center of the magnetic core 91. Consequently, the feedback current Is flowing through the secondary winding 94 decreases, and a value smaller than the current actually flowing through the primary conductor 50 is measured as the current value of the primary conductor 50.

Figure 2:
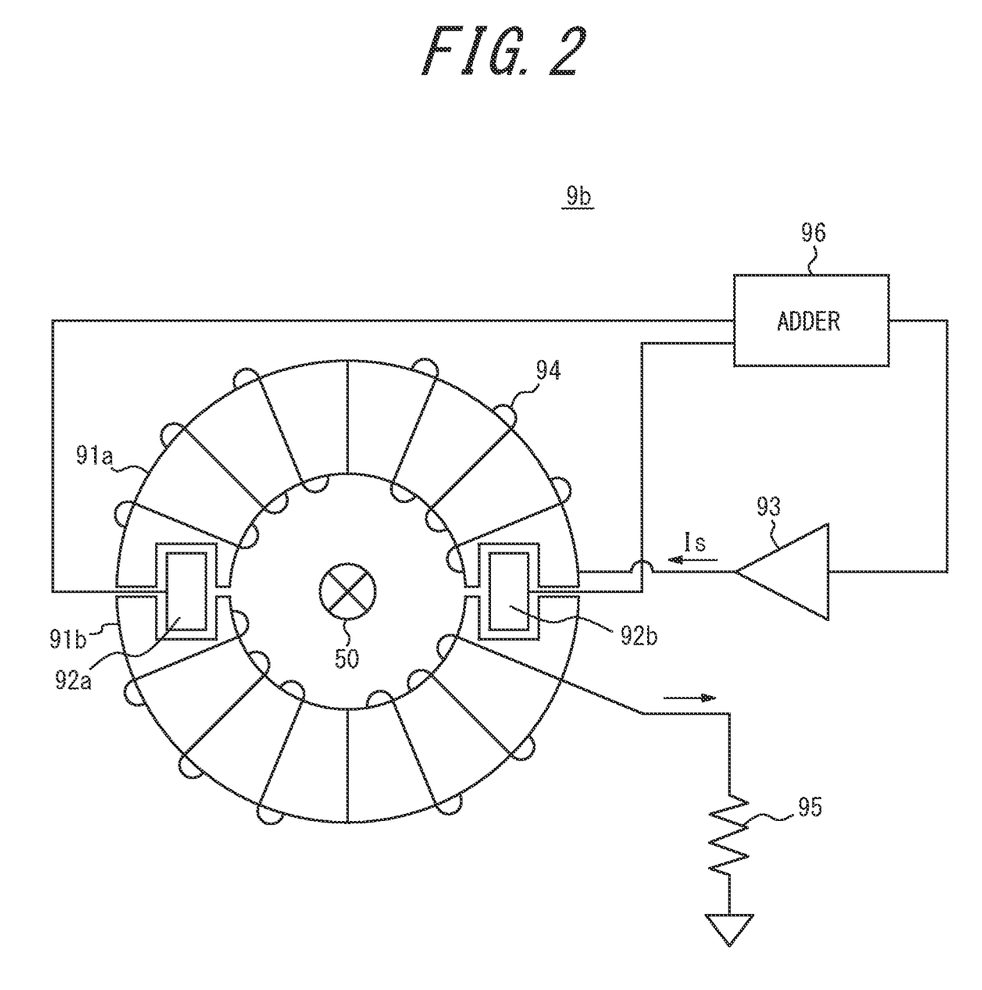
FIG. 2 is a diagram illustrating a configuration of a current sensor according to a comparative example.

FIG. 2 is a diagram illustrating a configuration of a current sensor 9b according to a second comparative example. Unlike the current sensor 9a, the current sensor 9b includes two magnetoelectric conversion elements 92a, 92b provided in the gaps between magnetic cores 91a, 91b. The current sensor 9b outputs, as feedback current Is, a current corresponding to the current value yielded by an adder 96 adding the currents corresponding to the magnetic flux detected at these magnetoelectric conversion elements 92a, 92b. Consequently, the current sensor 9b can reduce the variation in the feedback current Is caused by the primary conductor 50 shifting from the center of the magnetic core 91.

In the current sensor 9b, however, the same feedback current Is flows through the secondary winding 94 as negative feedback current over the entire magnetic cores 91a, 91b, regardless of the position of the primary conductor 50 relative to the magnetic cores 91a, 91b. Therefore, depending on the feedback current Is, the magnetic flux density that has different gradients depending on the position relative to the magnetic cores 91a, 91b cannot sufficiently be canceled, and residual magnetic flux exists. Such residual magnetic flux is a factor in the error in the measured value of the current of the primary conductor 50 as based on the voltage of the resistor 95 in response to the feedback current Is. Furthermore, as the current flowing through the primary conductor 50 increases, the residual magnetic flux inside the magnetic cores 91a, 91b also increases and eventually reaches the saturation magnetic flux density of the magnetic cores 91a, 91b. When the residual magnetic flux reaches the saturation magnetic flux density of the magnetic cores 91a, 91b, the feedback current Is no longer sufficiently reflects the magnitude of the current flowing through the primary conductor 50, and the error in the measured value of the current of the primary conductor 50 as based on the voltage of the resistor 95 becomes even larger. Increasing the cross-sectional area of the magnetic cores 91a, 91b can increase the current flowing through the primary conductor 50 until the residual magnetic flux reaches the saturation magnetic flux density, but this approach increases the size of the current sensor 9b.

Thus, the current sensors 9a, 9b according to the comparative examples have room for improvement in the measurement accuracy of the current to be measured flowing through the conducting wire in a case in which the conducting wire is not located at the center of the magnetic cores 91, 91a, 91b.

Embodiments

Embodiments of the present disclosure are now described with reference to the drawings. Portions having an identical configuration or function in the drawings are labeled with the same reference signs. In the explanation of the embodiments, a redundant description of identical portions may be omitted or simplified as appropriate.

A current sensor according to an embodiment of the present disclosure includes a plurality of magnetoelectric conversion elements and a plurality of secondary windings wound around a portion of a magnetic core near each magnetoelectric conversion element and measures a current to be measured based on the total value of the feedback currents outputted from the plurality of secondary windings. Therefore, the current sensor according to the present disclosure can effectively cancel non-uniformly distributed magnetic flux intensity and reduce residual magnetic flux without an increase in size. According to the current sensor of the present disclosure, the current to be measured flowing through the conducting wire can thus be measured with higher accuracy.

Figure 3:
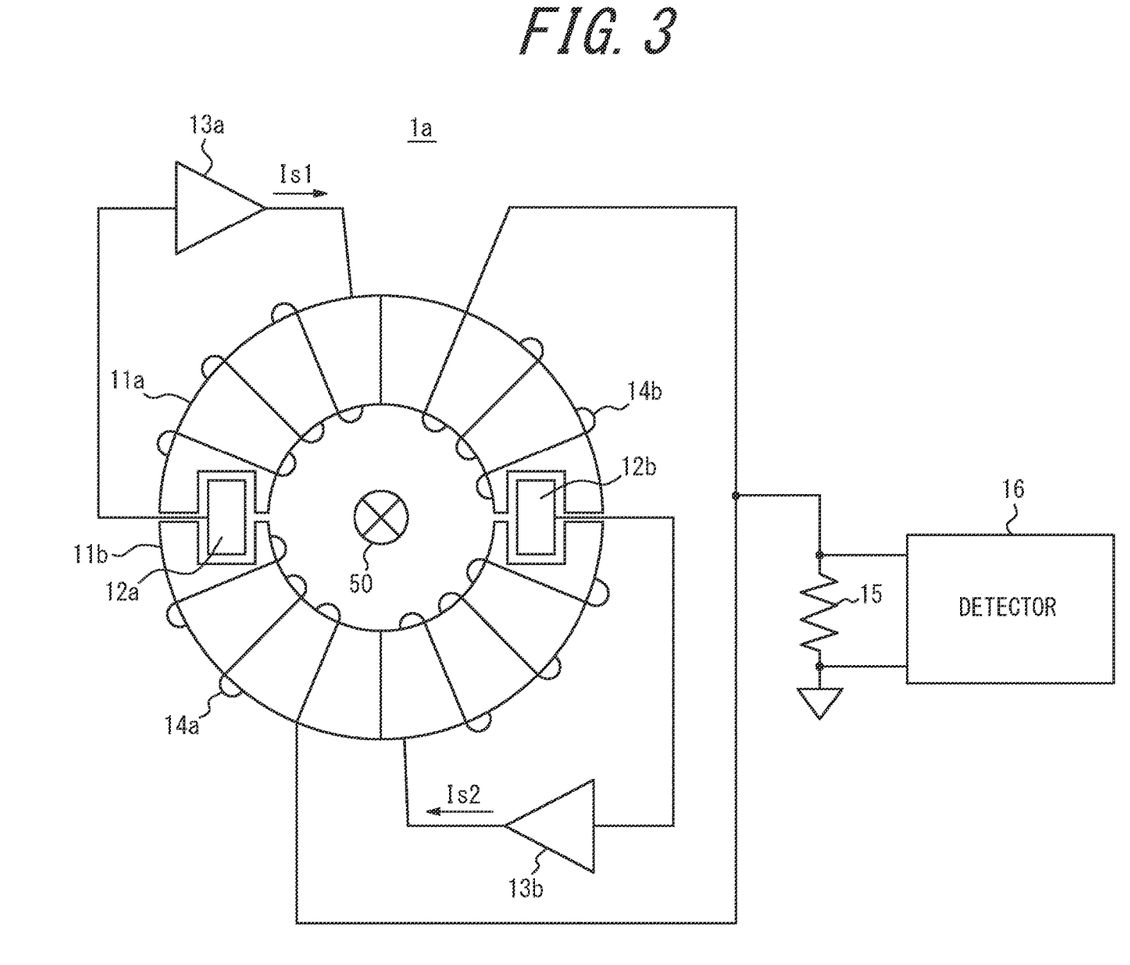
FIG. 3 is a diagram illustrating an example configuration of a current sensor according to an embodiment of the present disclosure.

FIG. 3 is a diagram illustrating an example configuration of a current sensor 1a according to an embodiment of the present disclosure. The current sensor 1a is an apparatus that measures a current to be measured flowing through a primary conductor 50. The primary conductor 50 is a conducting wire, through which the current to be measured flows, and extends from in front to behind the drawing. The current sensor 1a can measure the current value both in the case of AC current and the case of DC current flowing in the primary conductor 50. The current sensor 1a includes a magnetic core 11 (11a, 11b), two magnetoelectric conversion elements 12 (12a, 12b), two amplifiers 13 (13a, 13b), two secondary windings 14 (14a, 14b), a resistor 15, and a detector 16. As illustrated in FIG. 3, in the current sensor 1a, the path connecting the magnetoelectric conversion element 12a, the amplifier 13a, the secondary winding 14a, and the resistor 15 and the path connecting the magnetoelectric conversion element 12b, the amplifier 13b, the secondary winding 14b, and the resistor 15 are connected in parallel with each other.

The magnetic core 11 (11a, 11b) is a magnetic body configured in a ring shape that serves as a passageway for magnetic flux. The magnetic core 11 (11a, 11b) can be arranged to surround the primary conductor 50. When a current flows through the primary conductor 50, a magnetic field corresponding to the current in the primary conductor 50 is formed around the primary conductor 50 due to the effect of electromagnetic induction. The magnetic core 11 (11a, 11b) increases the sensitivity of magnetic flux detection in the magnetoelectric conversion elements 12 (12a, 12b). The magnetic core 11 (11a, 11b) may be made of iron, for example.

The magnetic core 11 in FIG. 3 includes two magnetic cores 11a, 11b facing each other, and gaps (voids) are provided between the magnetic cores 11a, 11b for provision of the magnetoelectric conversion elements 12 (12a, 12b), but the magnetic core 11 is not limited to such a configuration. For example, the magnetic core 11 may be configured by one continuous magnetic body or by three or more magnetic bodies. The magnetic core 11 may have three or more gaps. The magnetic core 11 may be divided into a plurality of magnetic bodies, and these magnetic bodies may be openable and closable by, for example, a hinge mechanism. By configuring the magnetic core 11 to be openable and closable by a hinge mechanism or the like, the user can easily clamp the primary conductor 50 with the current sensor 1a.

The magnetoelectric conversion elements 12 (12a, 12b) are magnetic sensors that detect the magnetic flux in a predetermined portion of the magnetic core 11 (11a, 11b). In the example in FIG. 3, the current sensor 1a includes magnetoelectric conversion elements 12 (12a, 12b) in the gap provided between the two magnetic cores 11a, 11b. The magnetoelectric conversion elements 12 (12a, 12b) may, for example, be Hall elements or flux gates. The two magnetoelectric conversion elements 12 (12a, 12b) may be provided facing each other as viewed from the center of the magnetic core 11 (11a, 11b). In the example in FIG. 3, the magnetoelectric conversion element 12a is provided on the left side of the magnetic core 11 (11a, 11b) in FIG. 3 and detects the magnetic flux in the left portion of the magnetic core 11 (11a, 11b). The magnetoelectric conversion element 12b is provided on the right side of the magnetic core 11 (11a, 11b) in FIG. 3 and detects the magnetic flux in the right portion of the magnetic core 11 (11a, 11b). The magnetoelectric conversion elements 12 (12a, 12b) each output the intensity of the detected magnetic flux to the corresponding amplifier 13 (13a, 13b).

The amplifiers 13 (13a, 13b) are amplifiers that amplify the output of the corresponding magnetoelectric conversion elements 12 (12a, 12b) and output currents corresponding to the output of the magnetoelectric conversion elements 12 to the corresponding secondary windings 14 (14a, 14b) as feedback currents Is1, Is2.

The secondary windings 14 (14a, 14b) are feedback coils wound around the magnetic core 11. The secondary windings 14 (14a, 14b) are wound around the magnetic core 11 and pass the current outputted by the corresponding amplifier 13 in a direction that cancels the magnetic flux in the predetermined portion of the magnetic core 11. For example, the secondary windings 14 (14a, 14b) may be wound around a portion of the magnetic core 11 near the corresponding magnetoelectric conversion element 12 (12a, 12b) and generate magnetic flux to cancel the magnetic flux generated in the surrounding area. Specifically, the secondary windings 14a, 14b may be wound around portions of the magnetic core 11 such that the corresponding magnetoelectric conversion elements 12a, 12b are located at the center. In the example in FIG. 3, the secondary winding 14a is wound around the left half of the magnetic core 11 (11a, 11b), and the secondary winding 14b is wound around the right half of the magnetic core 11 (11a, 11b). As illustrated in FIG. 3, the feedback current Is1 outputted from the amplifier 13a is outputted through the secondary winding 14a to the resistor 15. The feedback current Is2 outputted from the amplifier 13b is outputted through the secondary winding 14b to the resistor 15. Since the feedback currents Is1, Is2 are outputted to the resistor 15 through paths connected in parallel with each other, the sum Is1+Is2 of the feedback currents Is1, Is2 is inputted to the resistor 15.

The resistor 15 is a shunt resistor for detecting the sum Is1+Is2 of the feedback currents Is1, Is2. A current yielded by combining the currents flowing through each of the plurality of secondary windings 14 (14a, 14b) thus flows through the resistor 15. The resistor 15 is arranged between the secondary windings 14 (14a, 14b) and ground.

The detector 16 is an apparatus that detects the current to be measured flowing through the primary conductor 50 based on the current yielded by combining the currents flowing through each of the plurality of secondary windings 14 (14a, 14b). The detector 16 may detect the current to be measured based on the voltage at both ends of the resistor 15. The detector 16 may, for example, amplify the voltage between both terminals of the resistor 15 and convert the amplified voltage to the value of current flowing through the primary conductor 50. Here, the detector 16 may convert the voltage at the resistor 15 to the value of current in the primary conductor 50 using a predetermined conversion formula based on the case in which the primary conductor 50 is provided at a reference position (for example, the center of the magnetic core 11) in the magnetic core 11 (11a, 11b).

As described above, the current sensor 1a includes the secondary windings 14a, 14b wound around a portion of the magnetic core 11 near each of the magnetoelectric conversion elements 12a, 12b, and passes feedback currents Is1, Is2 according to the magnetic flux detected at the magnetoelectric conversion elements 12a. 12b. Therefore, the current sensor 1a can effectively cancel the magnetic flux distributed around each of the secondary windings 14a, 14b even when the primary conductor 50 is shifted from the center of the magnetic core 11 (11a, 11b).

Figure 4:
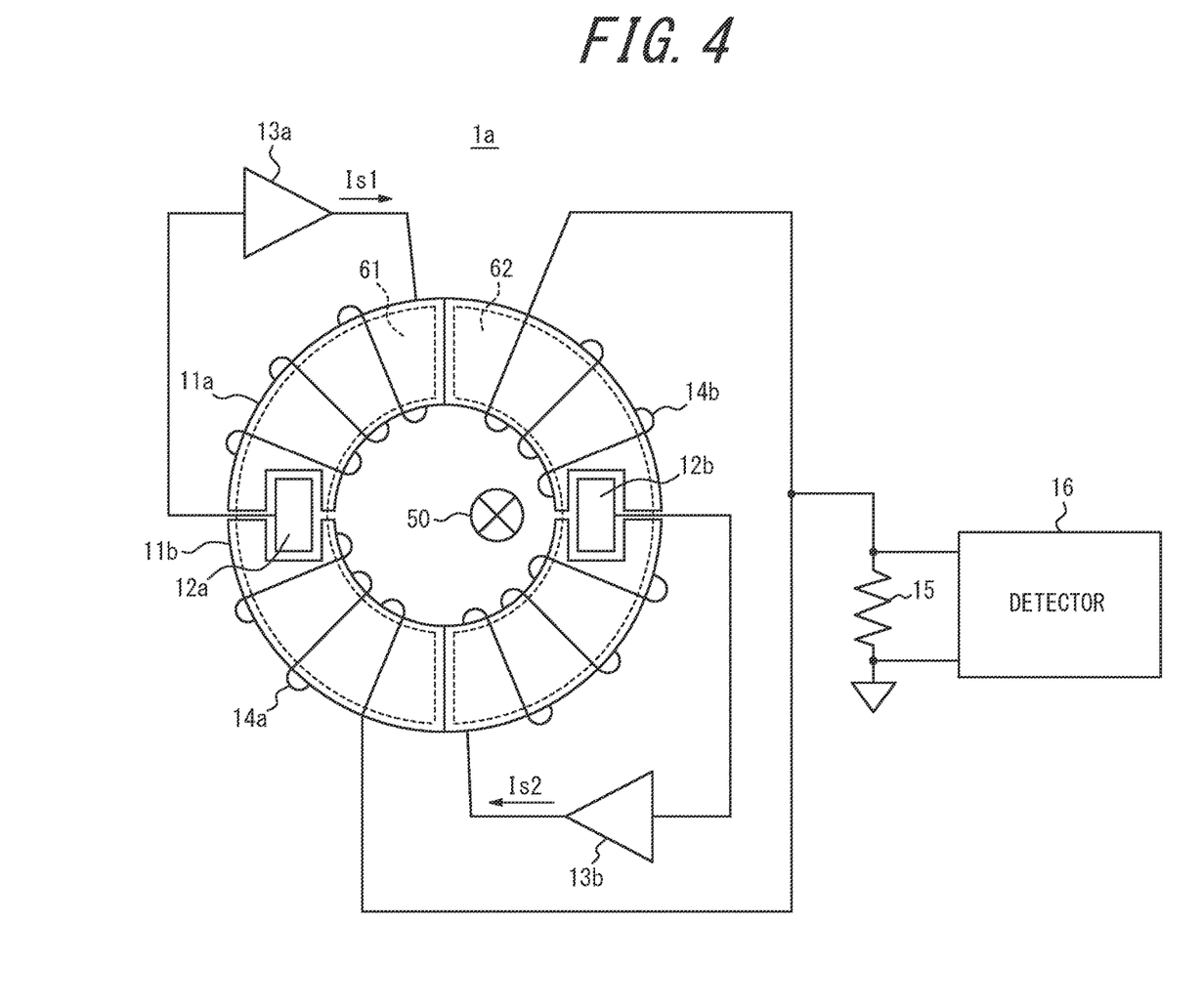
FIG. 4 is a diagram illustrating operations by the current sensor in FIG. 3.
Figure 5:
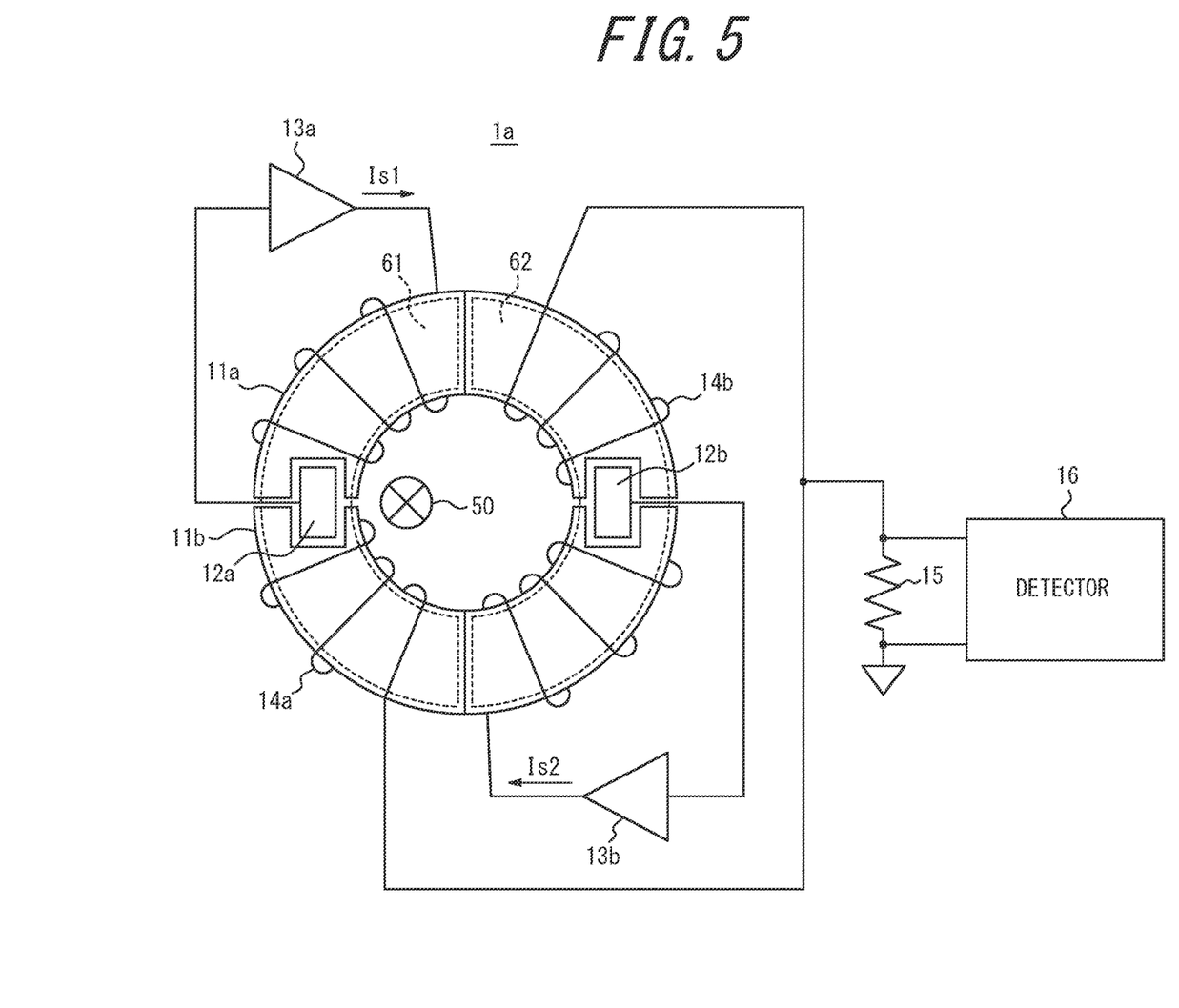
FIG. 5 is a diagram illustrating operations by the current sensor in FIG. 3.

FIGS. 4 and 5 illustrate the operation of the current sensor 1a in FIG. 3 in a case in which the primary conductor 50 is located at a position shifted from the center of the magnetic core 11 (11a, 11b). In FIG. 4, the primary conductor 50 is located at a position that is shifted to the right from the center of the magnetic core 11 (11a, 11b). Therefore, even when a current of the same magnitude flows through the primary conductor 50, a smaller magnetic flux is generated in a region 61 in the left half of the magnetic core 11 than when the primary conductor 50 is located in the center of the magnetic core 11 (11a, 11b). Consequently, a small feedback current Is1 flows in the secondary winding 14a provided in the left half of the magnetic core 11, and the magnetic flux is canceled (offset) by an appropriate negative feedback current according to the position of the primary conductor 50. On the other hand, a larger magnetic flux is generated in a region 62 in the right half of the magnetic core 11 than when the primary conductor 50 is located in the center of the magnetic core 11 (11a, 11b). Consequently, a large feedback current Is2 flows in the secondary winding 14b provided in the right half of the magnetic core 11, and the magnetic flux is canceled by an appropriate negative feedback current according to the position of the primary conductor 50. Even if a large current flows in the primary conductor 50, a larger current flows in the secondary winding 14b according to the magnitude of that large current, which can prevent the residual magnetic flux from reaching the saturation magnetic flux density of the magnetic core 11. Furthermore, since the current sensor 1a measures the current flowing through the primary conductor 50 based on the sum Is1+Is2 of the feedback currents Is1, Is2, the current in the primary conductor 50 can be measured with high accuracy regardless of the position of the primary conductor 50.

In FIG. 5, the primary conductor 50 is located at a position that is shifted to the left from the center of the magnetic core 11 (11a, 11b). Therefore, even when a current of the same magnitude flows through the primary conductor 50, a larger magnetic flux is generated in the region 61 in the left half of the magnetic core 11 than when the primary conductor 50 is located in the center of the magnetic core 11 (11a, 11b). Consequently, a large feedback current Is1 flows in the secondary winding 14a provided in the left half of the magnetic core 11, and the magnetic flux is canceled by an appropriate negative feedback current according to the position of the primary conductor 50. Even if a large current flows in the primary conductor 50, a larger current flows in the secondary winding 14a according to the magnitude of that large current, which can prevent the residual magnetic flux from reaching the saturation magnetic flux density of the magnetic core 11. On the other hand, a smaller magnetic flux is generated in the region 62 in the right half of the magnetic core 11 than when the primary conductor 50 is located in the center of the magnetic core 11 (11a, 11b). Consequently, a small feedback current Is2 flows in the secondary winding 14b provided in the right half of the magnetic core 11, and the magnetic flux is canceled by an appropriate negative feedback current according to the position of the primary conductor 50. Furthermore, since the current sensor 1a measures the current flowing through the primary conductor 50 based on the sum Is1+Is2 of the feedback currents Is1, Is2, the current in the primary conductor 50 can be measured with high accuracy regardless of the position of the primary conductor 50.

In this way, the magnetoelectric conversion elements 12 (12a, 12b) pass the respective feedback currents Is1, Is2 according to the magnetic flux in the corresponding portions of the magnetic core 11 (for example, regions 61, 62) to the corresponding secondary windings 14 (14a, 14b). The current sensor 1a thus operates the magnetoelectric conversion elements 12 (12a, 12b) and the secondary windings 14 (14a, 14b) in parallel as a set. Therefore, even when the primary conductor 50 is shifted from the center of the magnetic core 11, the current sensor 1a can reduce the residual magnetic flux in each portion of the magnetic core 11 to nearly zero. The current sensor 1a can consequently measure the current to be measured with high accuracy without increasing the size of the magnetic core 11 and without saturating the magnetic flux in the magnetic core 11.

Although the current sensor 1a is configured so that two paths including the magnetoelectric conversion elements 12, the amplifiers 13, and the secondary windings 14 are connected in parallel, the current sensor 1 may be provided with any number, two or greater, of such paths. By providing more paths including the magnetoelectric conversion elements 12, the amplifiers 13, and the secondary windings 14, the current sensor 1 can more effectively cancel the residual magnetic flux generated in the magnetic core 11 in a case in which the primary conductor 50 is shifted from the center of the magnetic core 11.

Figure 6:
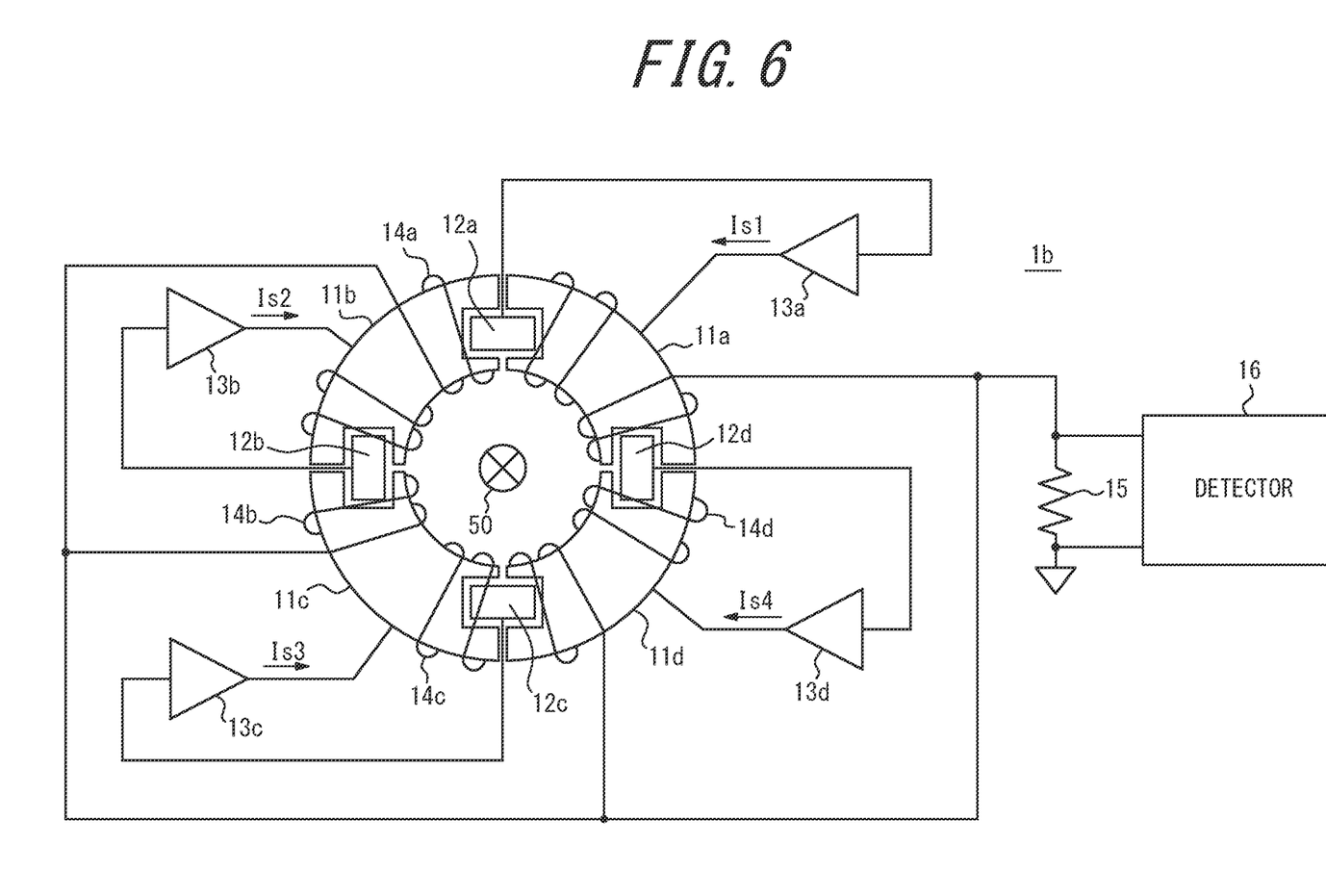
FIG. 6 is a diagram illustrating an example configuration of a current sensor according to an embodiment of the present disclosure.

FIG. 6 is a diagram illustrating an example configuration of a current sensor 1b according to an embodiment of the present disclosure. The current sensor 1b has a configuration in which four paths including magnetoelectric conversion elements 12 (12a to 12d), amplifiers 13 (13a to 13d), and secondary windings 14 (14a to 14d) are connected in parallel.

In the configuration illustrated in FIG. 6, when a current flows through the primary conductor 50, a magnetic field corresponding to the current in the primary conductor 50 is formed concentrically with the primary conductor 50. Four magnetoelectric conversion elements 12 (12a to 12d) are installed in respective gaps (voids) of the magnetic core 11 (11a to 11d) to detect the intensity of the magnetic flux generated in a predetermined portion in the magnetic core 11. In the example in FIG. 6, the magnetoelectric conversion element 12a detects the magnetic flux on the upper side of the magnetic core 11. The magnetoelectric conversion element 12b detects the magnetic flux on the left side of the magnetic core 11. The magnetoelectric conversion element 12c detects the magnetic flux on the lower side of the magnetic core 11. The magnetoelectric conversion element 12d detects the magnetic flux on the right side of the magnetic core 11. The magnetoelectric conversion elements 12 (12a to 12d) output the respective results of detection to the amplifiers 13 (13a to 13d).

The amplifiers 13 (13a to 13d) each amplify the detected magnetic flux, inputted from the respective magnetoelectric conversion elements 12 (12a to 12d), and output the result as feedback currents Is1 to Ts4 to the corresponding secondary windings 14 (14a to 14d).

The secondary windings 14 (14a to 14d) are wound around corresponding portions of the magnetic core 11 to cancel the magnetic flux in the magnetic core 11 detected by the corresponding magnetoelectric conversion elements 12 (12a to 12d). In the example in FIG. 6, the secondary winding 14a is wound on the upper side of the magnetic core 11. The secondary winding 14b is wound on the left side of the magnetic core 11. The secondary winding 14c is wound on the lower side of the magnetic core 11. The secondary winding 14d is wound on the right side of the magnetic core 11. The feedback currents Is1 to Is4 outputted from the amplifiers 13 (13a to 13d) are outputted through the corresponding secondary windings 14 (14a to 14d) to the resistor 15. Since the feedback currents Is1 to Is4 are outputted to the resistor 15 through paths connected in parallel with each other, the sum Is1+Is2+Is3+Is4 of the feedback currents Is1 to Is4 is inputted to the resistor 15.

The resistor 15 is provided between the secondary windings 14 (14a to 14d), which are connected in parallel with each other, and ground. The voltage detected between the terminals of the resistor 15 is amplified, and the amplified voltage is converted to a value of current flowing through the primary conductor 50.

As described above, the current sensor 1b includes the secondary windings 14a to 14d wound around a portion of the magnetic core 11 near each of the magnetoelectric conversion elements 12a to 12d and passes feedback currents Is1 to Is4 according to the magnetic flux detected at the magnetoelectric conversion elements 12a to 12d. Therefore, even when the primary conductor 50 is shifted from the center of the magnetic core 11 (11a, 11b), the current sensor 1b can effectively cancel the magnetic flux distributed around each of the secondary windings 14a to 14d based on a more detailed position of the primary conductor 50.

Figure 7:
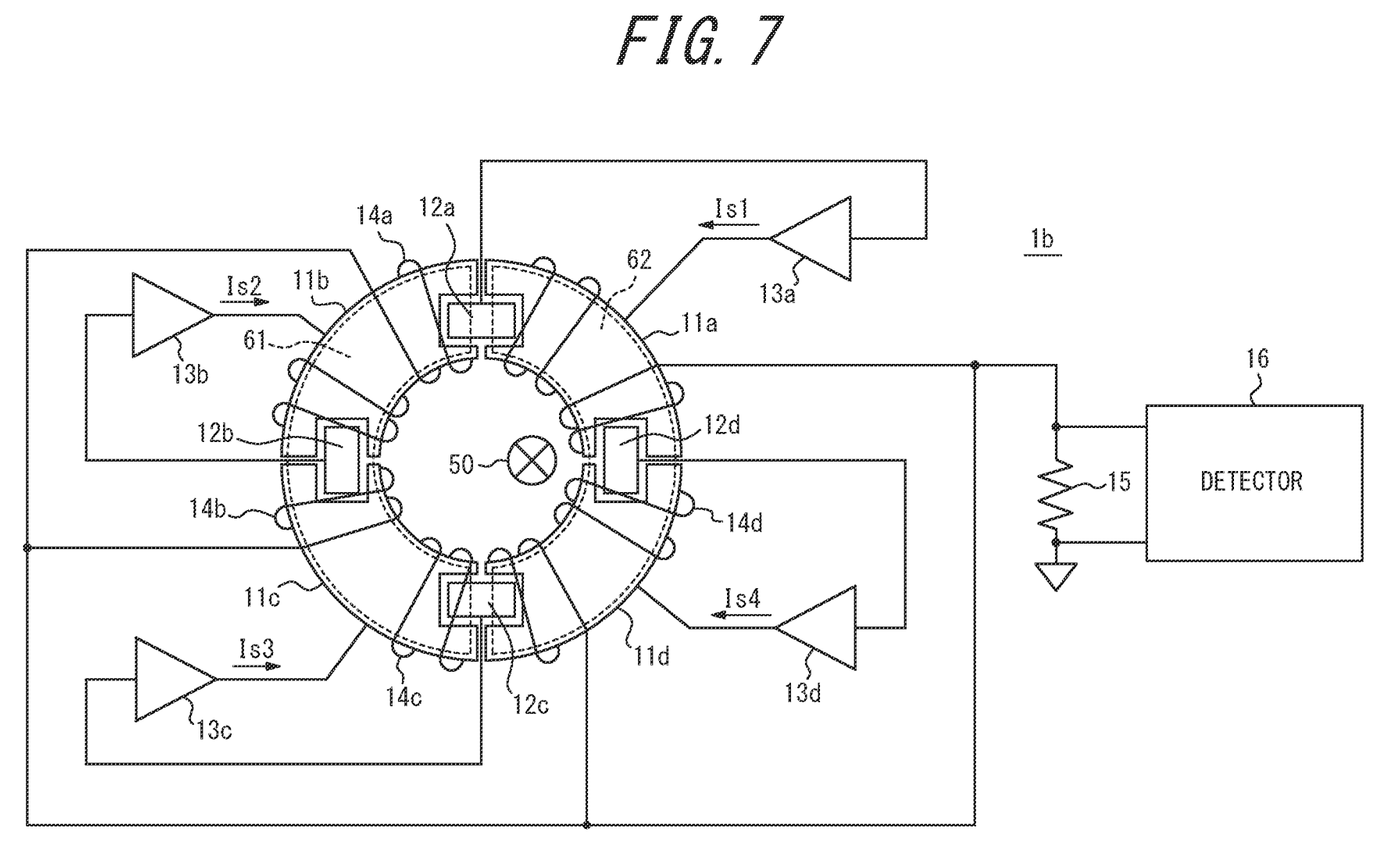
FIG. 7 is a diagram illustrating operations by the current sensor in FIG. 6.
Figure 8:
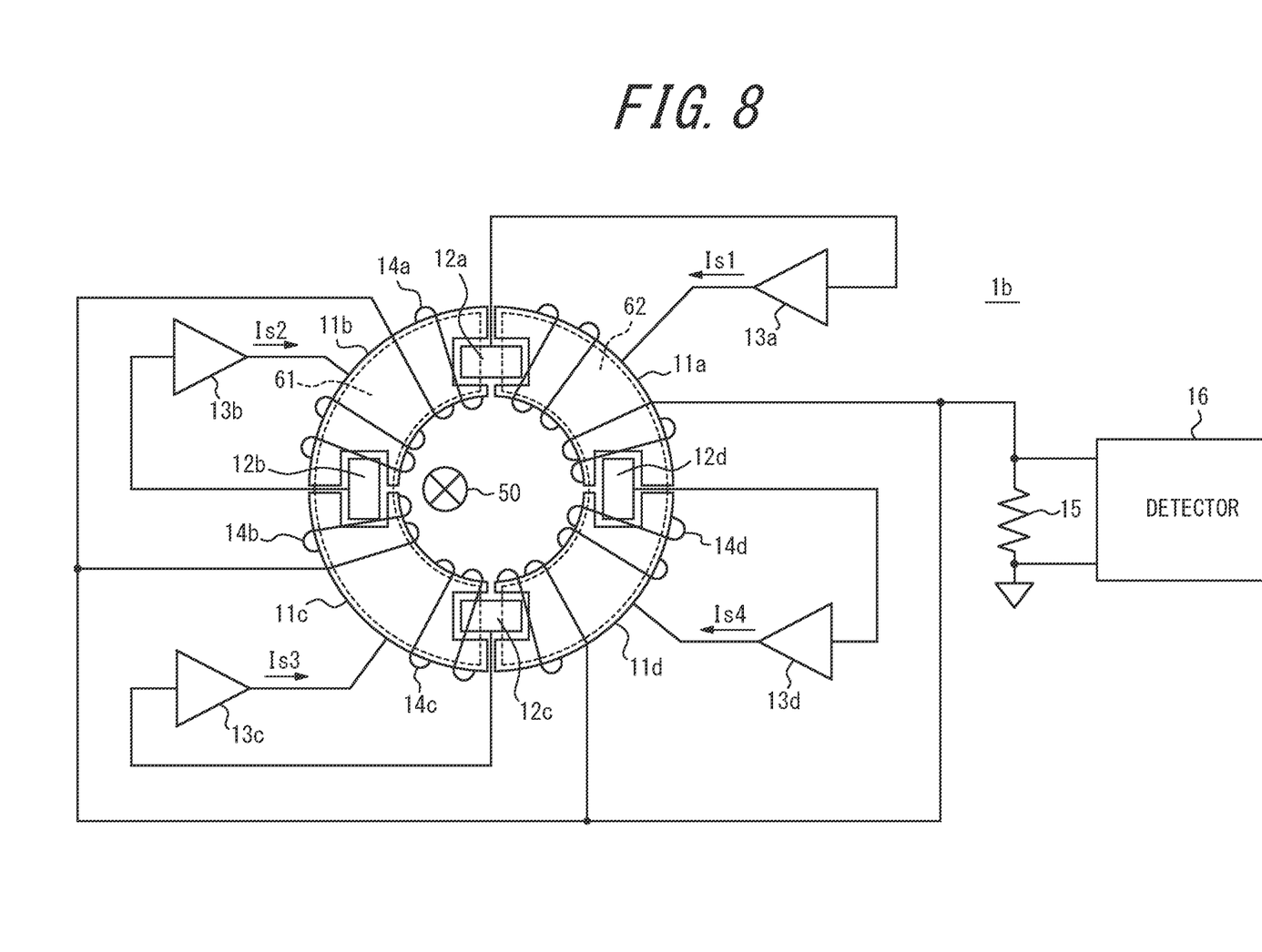
FIG. 8 is a diagram illustrating operations by the current sensor in FIG. 6.

FIGS. 7 and 8 illustrate the operation of the current sensor 1b in FIG. 6 in a case in which the primary conductor 50 is located at a position shifted from the center of the magnetic core 11 (11a to 11d). In FIG. 7, the primary conductor 50 is located at a position that is shifted to the right from the center of the magnetic core 11 (11a to 11d). Therefore, even when a current of the same magnitude flows through the primary conductor 50, a smaller magnetic flux is generated in a region 61 in the left half of the magnetic core 11 than when the primary conductor 50 is located in the center of the magnetic core 11 (11a to 11d). Consequently, a small feedback current Is2 flows in the secondary winding 14b provided on the left side of the magnetic core 11, feedback currents Is1, Is3 of medium magnitude flow in the secondary windings 14a, 14c provided on the upper and lower sides, and the magnetic flux is canceled by an appropriate negative feedback current according to the position of the primary conductor 50. On the other hand, a larger magnetic flux is generated in a region 62 in the right half of the magnetic core 11 than when the primary conductor 50 is located in the center of the magnetic core 11 (11a to 11d). Consequently, a large feedback current Is4 flows in the secondary winding 14d provided in the right side of the magnetic core 11, and the magnetic flux is canceled by an appropriate negative feedback current according to the position of the primary conductor 50. Even if a large current flows in the primary conductor 50, a larger current flows in the secondary winding 14d according to the magnitude of that large current, which can prevent the residual magnetic flux from reaching the saturation magnetic flux density of the magnetic core 11. Furthermore, since the current sensor 1b measures the current flowing through the primary conductor 50 based on the sum Is1+Is2+Is3+Is4 of the feedback currents Is1 to Is4, the current in the primary conductor 50 can be measured with high accuracy regardless of the position of the primary conductor 50.

In FIG. 8, the primary conductor 50 is located at a position that is shifted to the left from the center of the magnetic core 11 (11a to 11d). Therefore, even when a current of the same magnitude flows through the primary conductor 50, a larger magnetic flux is generated in the region 61 in the left half of the magnetic core 11 than when the primary conductor 50 is located in the center of the magnetic core 11 (11a to 11d). Consequently, a large feedback current Is2 flows in the secondary winding 14b provided on the left side of the magnetic core 11, and the magnetic flux is canceled by an appropriate negative feedback current according to the position of the primary conductor 50. Even if a large current flows in the primary conductor 50, a larger current flows in the secondary winding 14b according to the magnitude of that large current, which can prevent the residual magnetic flux from reaching the saturation magnetic flux density of the magnetic core 11. On the other hand, a smaller magnetic flux is generated in a region 62 in the right half of the magnetic core 11 than when the primary conductor 50 is located in the center of the magnetic core 11 (11a to 11d). Consequently, feedback currents Is1, Is3 of medium magnitude flow in the secondary windings 14a, 14c provided on the upper and lower sides of the magnetic core 11, a small feedback current Is4 flows in the secondary winding 14d provided on the right side, and the magnetic flux is canceled by an appropriate negative feedback current according to the position of the primary conductor 50. Furthermore, since the current sensor 1b measures the current flowing through the primary conductor 50 based on the sum Is1+Is2+Is3+Is4 of the feedback currents Is1 to Is4, the current in the primary conductor 50 can be measured with high accuracy regardless of the position of the primary conductor 50.

Figure 9:
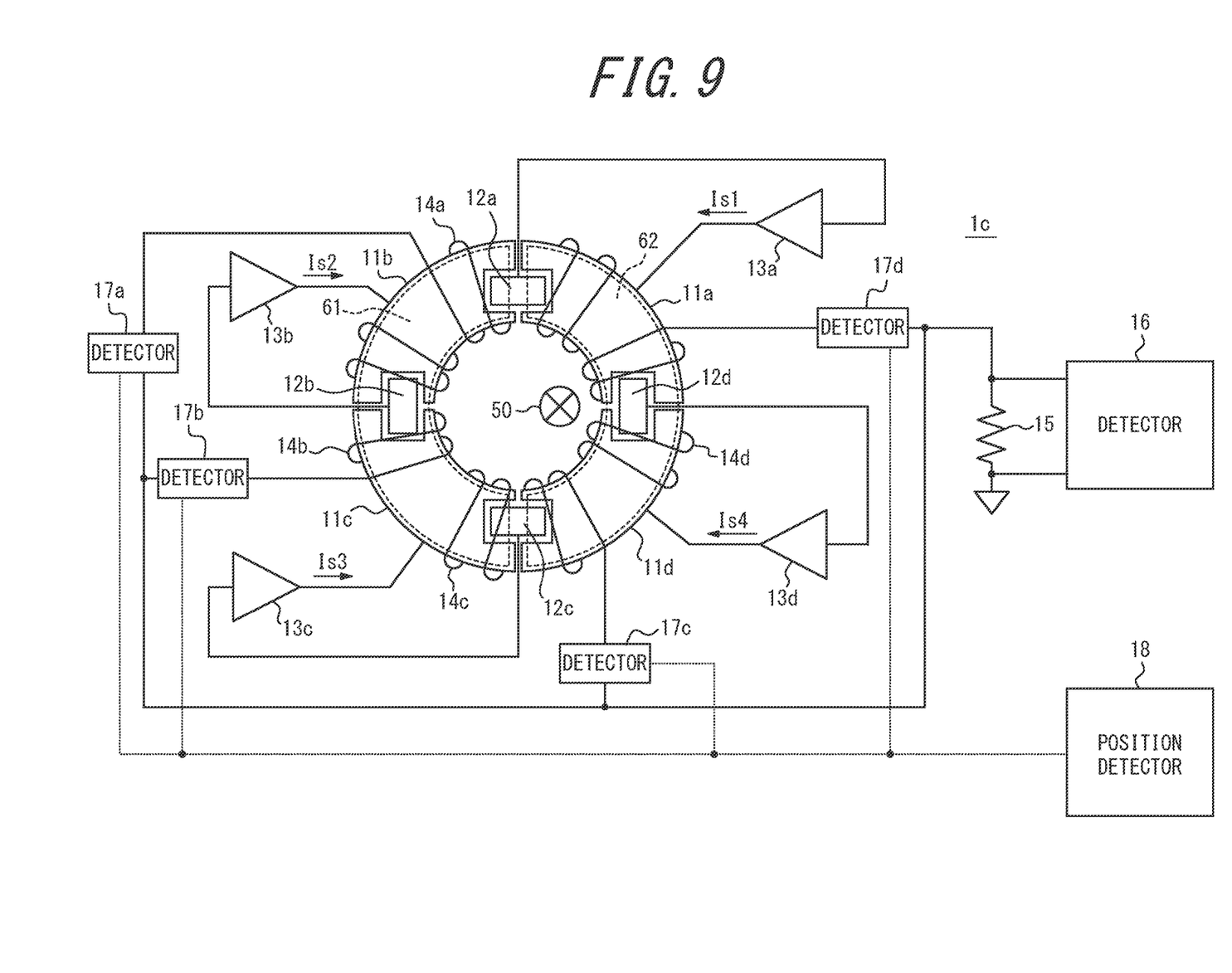
FIG. 9 is a diagram illustrating an example configuration of a current sensor according to an embodiment of the present disclosure.

The current sensor 1 may also detect the position of the primary conductor 50 relative to the magnetic core 11 based on the current flowing through each of the plurality of secondary windings 14. FIG. 9 is a diagram illustrating an example configuration of a current sensor according to an embodiment of the present disclosure. In FIG. 9, a current sensor 1c includes detectors 17 (17a to 17d) and a position detector 18 in addition to the configuration of the current sensor 1b described with reference to FIGS. 6 to 8.

The detectors 17 (17a to 17d) are ammeters that measure the feedback currents Is1 to Is4 flowing through the secondary windings 14 (14a to 14d).

The position detector 18 detects the position of the primary conductor 50 relative to the magnetic core 11 based on the feedback currents Is1 to Is4 flowing through each of the secondary windings 14a to 14d as measured by the detectors 17 (17a to 17d). The position of the primary conductor 50 relative to the magnetic core 11 is determined based on the position of each magnetoelectric conversion element 12 in the magnetic core 11 and the ratio of the feedback currents Is1 to Is4.

The position detector 18 may store, in advance, the correspondence relationship between the feedback currents Is1 to Is4 and the position of the primary conductor 50 relative to the magnetic core 11 and may detect the position of the primary conductor 50 relative to the magnetic core 11 by referring to that correspondence relationship. According to this configuration, the position detector 18 can detect the position of the primary conductor 50 at high speed. The current sensor 1c can accurately perform such position detection of the primary conductor 50 by being provided with three or more paths including the magnetoelectric conversion elements 12, the amplifiers 13, and the secondary windings 14 and by using the feedback current flowing through each secondary winding 14.

As described above, the current sensor 1 (1a, 1b, 1c) includes a magnetic core 11, a plurality of magnetoelectric conversion elements 12, a plurality of amplifiers 13 provided in correspondence with the plurality of magnetoelectric conversion elements 12, a plurality of secondary windings 14 provided in correspondence with the plurality of magnetoelectric conversion elements 12, and a detector 16. In the current sensor 1 (1a, 1b, 1c), the magnetic core 11 can be arranged to surround the primary conductor 50 through which the current to be measured flows. The magnetoelectric conversion elements 12 each detect magnetic flux in a predetermined portion of the magnetic core 11. Each of the amplifiers 13 amplifies the output of the corresponding magnetoelectric conversion element 12 and outputs a feedback current corresponding to the output of that magnetoelectric conversion element 12. Each of the secondary windings 14 is wound around the magnetic core 11 and passes the feedback current outputted by the corresponding amplifier 13 in a direction that cancels the corresponding magnetic flux in the predetermined portion of the magnetic core 11. The detector 16 detects the current to be measured based on the current yielded by combining the currents flowing through each of the plurality of secondary windings 14.

In this way, the current sensor 1 includes the plurality of magnetoelectric conversion elements 12 and the plurality of secondary windings 14 wound around a portion of the magnetic core 11 near each magnetoelectric conversion element 12 and measures a current to be measured based on the total value of the feedback currents outputted from the plurality of secondary windings 14. Therefore, the current sensor 1 according to the present disclosure can effectively cancel non-uniformly distributed magnetic flux intensity and reduce residual magnetic flux without an increase in size. According to the current sensor 1 of the present disclosure, the current to be measured flowing through the primary conductor 50 can thus be measured with higher accuracy.

The plurality of magnetoelectric conversion elements 12 may detect the magnetic flux of a plurality of portions of the magnetic core 11 arranged at equal angles as viewed from the center of the magnetic core 11 as the magnetic flux in the predetermined portion. For example, in a case in which four magnetoelectric conversion elements 12 (12a to 12d) are provided as illustrated in FIG. 6, four magnetoelectric conversion elements 12 (12a to 12d) may be provided at 90 degree intervals as viewed from the center of the magnetic core 11. This configuration enables the current sensor 1 to measure the current to be measured with high accuracy based on the feedback currents outputted from the plurality of secondary windings 14.

The current sensor 1 (1a, 1b, 1c) also includes the resistor 15 through which the current yielded by combining the currents flowing through each of the plurality of secondary windings 14 flows, and the detector 16 detects the current to be measured based on the voltage at both ends of the resistor 15. With a simple configuration, the current sensor 1 can therefore detect the current to be measured based on the current yielded by combining the currents flowing through each of the plurality of secondary windings 14. Instead of measuring the voltage at both ends of the resistor 15, the detector 16 may, for example, use a non-contact sensor to measure the current yielded by combining the currents flowing through each of the plurality of secondary windings 14.

As described above, the zero-flux type current sensor 1 includes a plurality of sets of a magnetoelectric conversion element 12 and a secondary winding 14 arranged in parallel, and a feedback current corresponding to the magnetic flux detected by each magnetoelectric conversion element 12 is applied to the corresponding secondary winding 14. Without increasing the size of the magnetic core 11, the current sensor 1 can therefore prevent a reduction in measurement sensitivity due to magnetic saturation caused by residual magnetic flux even when the position of the primary conductor 50 is shifted from the center of the magnetic core 11. The current sensor 1 may, for example, be implemented as a penetration-type or clamp-type AC/DC (alternating/direct current) current sensor. The current value of the primary conductor 50 detected by the above-described detector 16 and the position of the primary conductor 50 detected by the position detector 18 may be outputted to a display apparatus, such as a display, or to any storage medium.

An appendix of example embodiments of the present disclosure is provided below.

[1] A current sensor comprising:
   a magnetic core that can be arranged to surround a conducting wire through which a current to be measured flows;
   a plurality of magnetic sensors each configured to detect magnetic flux in a predetermined portion of the magnetic core;
   a plurality of amplifiers arranged in correspondence with the plurality of magnetic sensors;
   a plurality of feedback coils arranged in correspondence with the plurality of magnetic sensors; and
   a current detector configured to detect the current to be measured based on a current yielded by combining currents flowing through each of the plurality of feedback coils, wherein
   each of the plurality of amplifiers is configured to amplify an output of the corresponding magnetic sensor and output a current corresponding to the output of the corresponding magnetic sensor, and
   each of the plurality of feedback coils is wound around the magnetic core and passes the current outputted by the corresponding amplifier in a direction that cancels the magnetic flux in the predetermined portion of the corresponding magnetic core.

[2] The current sensor according to [1], further comprising a resistor through which the current yielded by combining the currents flowing through each of the plurality of feedback coils flows, wherein
   the current detector is configured to detect the current to be measured based on a voltage at both ends of the resistor.

[3] The current sensor according to [1] or [2], wherein the plurality of magnetic sensors is configured to detect a magnetic flux of a plurality of portions of the magnetic core arranged at equal angles as viewed from a center of the magnetic core as the magnetic flux in the predetermined portion.

[4] The current sensor according to any one of [1] to [3], further comprising a position detector configured to detect a position of the conducting wire relative to the magnetic core based on the current flowing through each of the plurality of feedback coils.

[5] The current sensor according to any one of [1] to [4], wherein the magnetic core is openable and closable.

The present disclosure is not limited to the above embodiments, and modifications can be made without departing from the spirit of the present disclosure.

The invention claimed is:

1. A current sensor comprising:
a magnetic core that can be arranged to surround a conducting wire through which a current to be measured flows;
a plurality of magnetic sensors each configured to detect magnetic flux in a predetermined portion of the magnetic core;
a plurality of amplifiers arranged in correspondence with the plurality of magnetic sensors;
a plurality of feedback coils arranged in correspondence with the plurality of magnetic sensors; and
a current detector configured to detect the current to be measured based on a current yielded by combining currents flowing through each of the plurality of feedback coils, wherein
each of the plurality of amplifiers is configured to amplify an output of the corresponding magnetic sensor and output a current corresponding to the output of the corresponding magnetic sensor,
each of the plurality of feedback coils is wound around the magnetic core and passes the current outputted by the corresponding amplifier in a direction that cancels the corresponding magnetic flux in the predetermined portion of the magnetic core,
the plurality of magnetic sensors is arranged at equal angles as viewed from a center of the magnetic core, and
the plurality of feedback coils, which correspond to a plurality of portions of the magnetic core of which the plurality of magnetic sensors detect a magnetic flux, is arranged at equal angles as viewed from the center of the magnetic core.

2. The current sensor according to claim 1, further comprising a resistor through which the current yielded by combining the currents flowing through each of the plurality of feedback coils flows, wherein
the current detector is configured to detect the current to be measured based on a voltage at both ends of the resistor.

3. The current sensor according to claim 1, further comprising a position detector configured to detect a position of the conducting wire relative to the magnetic core based on the current flowing through each of the plurality of feedback coils.

4. The current sensor according to claim 1, wherein the magnetic core is openable and closable.

5. A current sensor comprising:
a magnetic core that can be arranged to surround a conducting wire through which a current to be measured flows;
a plurality of magnetic sensors each configured to detect magnetic flux in a predetermined portion of the magnetic core;
a plurality of amplifiers arranged in correspondence with the plurality of magnetic sensors;
a plurality of feedback coils arranged in correspondence with the plurality of magnetic sensors; and
a current detector configured to detect the current to be measured based on a current yielded by combining currents flowing through each of the plurality of feedback coils, wherein
each of the plurality of amplifiers is configured to amplify an output of the corresponding magnetic sensor and output a current corresponding to the output of the corresponding magnetic sensor, and
each of the plurality of feedback coils is wound around the magnetic core and passes the current outputted by the corresponding amplifier in a direction that cancels the corresponding magnetic flux in the predetermined portion of the magnetic core,
further comprising a position detector configured to detect a position of the conducting wire relative to the magnetic core based on each position of the plurality of magnetic sensors in the magnetic core and ratio of the current flowing through each of the plurality of feedback coils.

* * * * *